April 11, 1972    A. N. DEY ET AL    3,655,585
METHOD OF PREPARING CATHODIC ELECTRODES
Filed Aug. 28, 1969
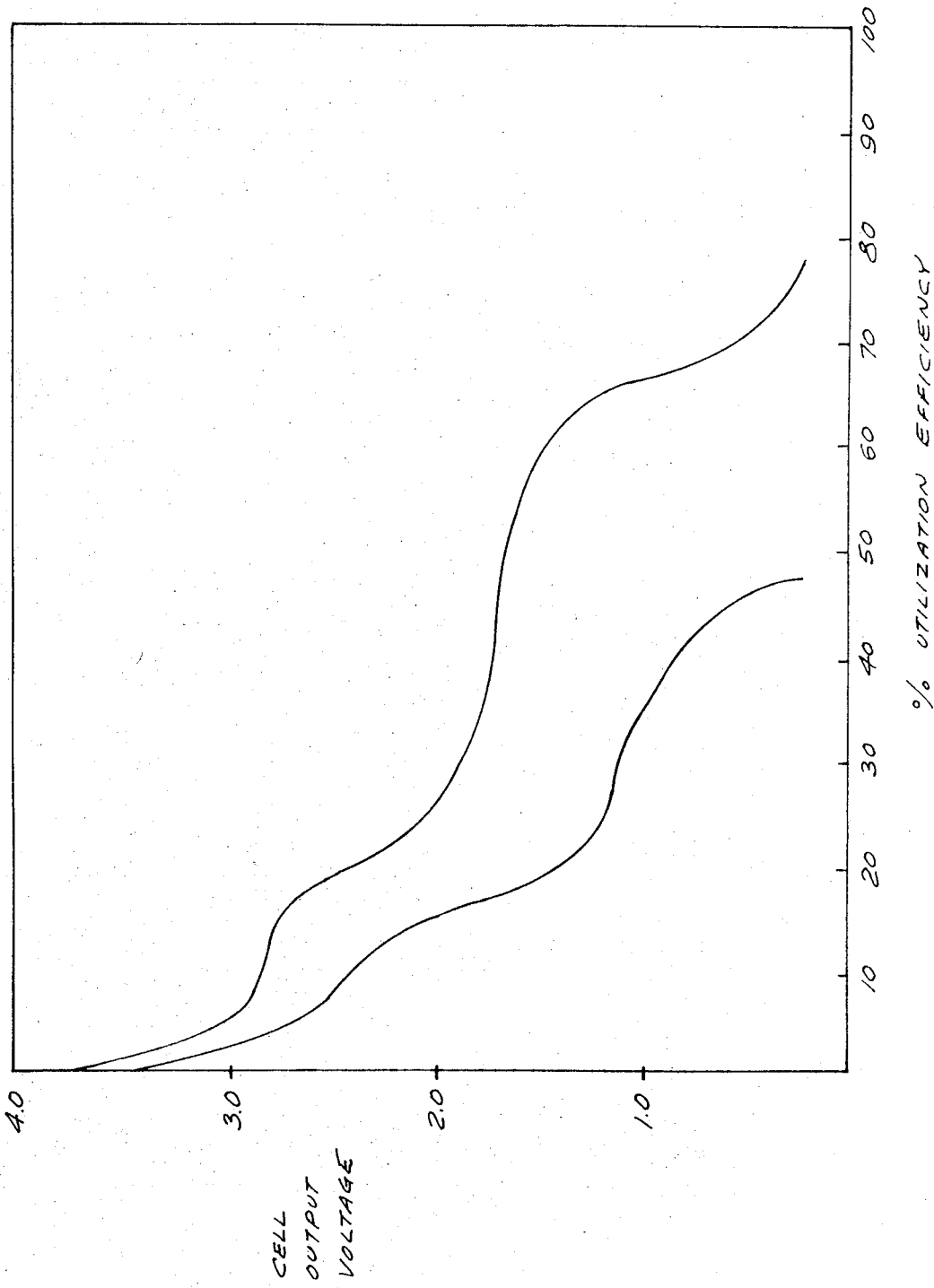

United States Patent Office 3,655,585
Patented Apr. 11, 1972

3,655,585
METHOD OF PREPARING CATHODIC ELECTRODES
Arabinda N. Dey, Needham, and Bernard P. Sullivan, Bedford, Mass., assignors to P. R. Mallory & Co., Inc., Indianapolis, Ind.
Filed Aug. 28, 1969, Ser. No. 853,817
Int. Cl. H01b 1/06; C01g 31/00
U.S. Cl. 252—506
10 Claims

ABSTRACT OF THE DISCLOSURE

A method for preparing cathodes having vanadium pentoxide active cathode material wherein direct use of vanadium pentoxide is not required. Electrodes having high porosity and providing highly efficient utilization of active cathode material are provided by pyrolytic decomposition of a pentavalent vanadium salt admixed with particulate conductive filler.

BACKGROUND OF THE INVENTION

This invention relates to an improved method for preparation of cathodic electrodes, the active material of which is vanadium pentoxide.

In copending application Ser. No. 829,849, filed on May 27, 1969, entitled "High Energy Density Organic Electrolyte Cell," and assigned to the present assignee, there are disclosed electrochemical cells having improved performance characteristics attributable in part to the inclusion of vanadium pentoxide active material in the cathodic electrodes thereof. As specified in that application, the superior charatceristics of vanadium pentoxide cathodic electrodes, namely, essential insolubility in organic electrolytes and high oxidizing power, provide improved electro-chemical cell performance, particularly defined by increased cell energy density and output voltage.

The method for preparation of the cathodic electrodes in the referenced application involves the pressure molding upon a metallic mesh of a blended mixture of vanadium pentoxide and chemically inert filler of higher electrical conductivity than vanadium pentoxide. Light metal organic electrolyte cells employing catholic electrodes so prepared yield output voltages of 3.7 volts and utilization efficiencies of over 40 percent.

While cathodic electrodes constructed in accordance with the method of the referenced application have performed successfully in permitting substantial benefit of the 276 amp-hr. per pound theoretical gravimetric capacity of vanadium pentoxide, the applicability of electrodes so prepared may be limited to cells for low rate applications due to the relatively non-porous surface which such electrodes present to electrolytes of electrochemical cells.

SUMMARY OF THE INVENTION

It is an object of the present invention to provide a method for preparation of cathodic electrodes containing vanadium pentoxide active cathode material adapted for use in cells for high rate application.

It is a more particular object of the present invention to provide a method for preparation of cathodic electrodes containing vanadium pentoxide active cathode material which does not require the direct use of a vanadium pentoxide constituent.

It is a further object of the present invention to provide high porosity cathodic electrodes containing vanadium pentoxide active cathode material.

In accordance with the invention, cathodic electrodes are provided by thermally decomposing a mixture comprised of a pentavalent vanadium salt starting material and particulate matter of higher electrical conductivity than vanadium pentoxide. Organic or inorganic material may be added to bind the mixture prior to decomposition of the starting material. In a particularly preferred practice of the method of the invention, the mixture comprises ammonium meta vanadate and graphite and a colloidal Teflon binder additive is employed. The mixture is molded on a metallic screen, is air dried and is subjected to pyrolysis by which the ammonium meta vanadate component of the mixture is decomposed to vanadium pentoxide.

By practice of the method of the invention a three-fold porosity increase is provided in the formed electrode as compared with the prior preparation method and electrodes so formed and deployed in light metal organic electrolyte cells provide substantially increased active cathode material utilization efficiency.

BRIEF DESCRIPTION OF THE DRAWINGS

The above and other objects and features of the invention will be evident from the following detailed description of the method of the invention and preferred practice thereof taken in conjunction with the drawing wherein utilization efficiency characteristics of vanadium pentoxide cathodes in high rate cell application are illustrated.

DESCRIPTION OF THE PREFERRED EMBODIMENTS

In place of the prior direct use of vanadium pentoxide, the method of the invention is receptive to starting materials of substantially reduced raw material cost. Any pentavalent vanadium salt chemically reducible to vanadium pentoxide may be employed, such as ammonium meta vanadate, sometimes referred to simply as ammonium vanadate. Other typical salts are the alkali metal vanadates in which the vanadium is pentavalent. The starting material is mixed thoroughly by ball milling or blending with a chemically inert filler having electrical conductivity substantially higher than the conductivity of vanadium pentoxide. A temperature-resistant binder may be added to the mixture.

In the case of ammonium meta vanadate starting material, the preferred mixture composition includes 75 percent of the pentavalent vanadium salt and 25 percent of conductive filler, preferably graphite. Up to 10 percent by weight of organic or inorganic temperature-resistant binder material is preferably added to the mixture. An aqueous dispersion of polytetrafluoroethylene, i.e. colloidal Teflon, is employed with advantage in conjunction with the ammonium meta vanadate and graphite mixture. Isopropanol, ethyl alcohol or the like is thoroughly mixed with the bound mixture to obtain a consistency of a pliable dough. The dough is then molded on a current collector such as a nickel screen or other metallic mesh under a pressure of 5000 lbs./cm.² or more. The thus molded electrode is air dried and thereafter subjected to pyrolysis in order to decompose the vanadium salt to vanadium pentoxide. Where the salt is ammonium meta vanadate, the pyrolysis temperature is preferably 300° C. and the following reaction is presumed to occur:

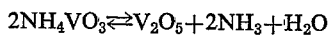

In this reaction, the products $NH_3$ and $H_2O$ escape to the atmosphere leaving a mass of vanadium pentoxide on the metallic substrate. The graphite and Teflon components of the mass, chemically inert in the above discussed reaction, are disposed throughout the mass.

Evaluation of the cathodic mass indicates same to have a highly porous surface area. By measurement, it has been found that forty-eight percent of the volume of the mass constitutes accessible surface area, thus providing the mass with superior capabilities for communication with liquid electrolytes. By way of comparison the porosity factor measured for vanadium pentoxide electrodes prepared by direct mixing and molding of vanadium pentoxide in its pure state, as disclosed in the above-referenced application, Ser. No. 829,849 is in the order of 15 percent.

The ratios of the pentavalent vanadium salt starting material and the additive particulate material of high electrical conductivity can be varied widely in the practice of the present invention. A range of 50 to 95 percent of vanadium salt respectively to 50 to 5 percent of particulate material is within the contemplation of the invention. Similarly the temperature-resistant binder material, which may be organic and comprised of the above specified colloidal Teflon or inorganic and comprised of silicates, plaster of paris, aluminates or borates, may be employed in amount varying from 0.5 percent to 10 percent by weight of the mixture of vanadium salt and particulate material. The temperature employed in thermal decomposition may be varied depending upon the constituents selected from 300° C. to 700° C.

Utilization efficiencies of cathodic electrodes prepared in accordance with the process of the invention were measured by deployment of the electrodes in a light metal organic electrolyte cell comprising an anodic electrode of lithium and an electrolyte comprising a one molar solution of lithium perchlorate ($LiClO_4$) in tetrahydrofuran (THF). The utilization efficiency characteristic for such cells employing vanadium pentoxide cathodes prepared by both the above-discussed prior method and the method of the invention and discharged at high rate application current density of 2 milliamperes/$cm.^2$, are illustrated in the drawing. The curve A indicates that the cathodic electrode prepared by direct molding of vanadium pentoxide has a utilization efficiency of approximately 40 percent, i.e. about 40 percent of the available vanadium pentoxide active cathode material is utilized in cell operation prior to decrease of the cell voltage to 1.0 volts. In contrast, the curve B indicates that cathodic electrodes prepared by the process of the present invention have utilization efficiencies of 60 to 70 percent.

What is claimed is:

1. A method of fabricating a porous vanadium pentoxide cathode active material for electrochemical cells comprising the steps of: preparing a mixture, said mixture consisting of a pentavalent vanadium salt, of a particulate matter having a higher electrical conductivity than vanadium pentoxide, and of a temperature resistant binder; and then heating said mixture at substantially 300° C. to pyrolytically decompose the salt and to form a porous vanadium pentoxide cathode active material with the particulate matter and the binder disposed throughout said cathode active material.

2. The method claimed in claim 1 wherein said salt is an alkali metal vanadate.

3. The method claimed in claim 1 wherein said salt is ammonium metavanadate.

4. The method claimed in claim 3 wherein said particulate matter is graphite.

5. The method claimed in claim 4 wherein said binder is colloidal polytetrafluoroethylene, comprising from 0.5 to 10.0 percent of the weight of said mixture.

6. The method claimed in claim 4 wherein said ammonium vanadate and said graphite are provided in the weight ratio of 3:1.

7. The method claimed in claim 6 wherein said colloidal polytetrafluoroethylene comprises 2.5 percent of the weight of said mixture.

8. A method of fabricating a porous vanadium pentoxide cathode active material for electrochemical cells comprising the steps of: preparing a mixture, said mixture consisting of 50% to 95% of a pentavalent vanadium salt, of 5% to 50% of graphite particulate matter having a higher electrical conductivity than vanadium pentoxide, and of 0.5% to 10% of a temperature-resistant binder; and then heating said mixture at substantially 300° C. to pyrolytically decompose the salt and to form a porous vanadium pentoxide cathode active material with the graphite particulate matter and the binder disposed throughout said cathode active material.

9. The method claimed in claim 8 wherein said salt is ammonium metavanadate.

10. The method claimed in claim 8 wherein said salt is an alkali metal vanadate.

References Cited

UNITED STATES PATENTS

| | | | |
|---|---|---|---|
| 3,423,242 | 1/1969 | Meyers et al. | 136—6 |
| 3,333,916 | 8/1967 | Burwell | 23—140 X |
| 3,385,736 | 5/1968 | Deibert | 264—105 X |
| 3,503,810 | 3/1970 | Groce | 264—105 X |

FOREIGN PATENTS 223,082　11/1968　U.S.S.R.

OTHER REFERENCES

Yu et al., "Chemical Abstracts," vol. 65, 1966, p. 5000a.

JOHN T. GOOLKASIAN, Primary Examiner

J. C. GIL, Assistant Examiner

U.S. Cl. X.R.

23—140; 136—120; 252—510, 511, 518; 264—105